United States Patent
Shih

(10) Patent No.: US 7,097,805 B2
(45) Date of Patent: Aug. 29, 2006

(54) METHOD FOR MANUFACTURING SLIPPERY-PROOF FOAM MATERIALS HAVING PROTRUDED THREADS

(75) Inventor: Ruey-Sheng Shih, Tainan (TW)

(73) Assignee: Microcell Composite Company, Tainan (TW)

( * ) Notice: Subject to any disclaimer, the term of this patent is extended or adjusted under 35 U.S.C. 154(b) by 273 days.

(21) Appl. No.: 10/863,262

(22) Filed: Jun. 9, 2004

(65) Prior Publication Data

US 2005/0275127 A1 Dec. 15, 2005

(51) Int. Cl.
*B29C 44/02* (2006.01)
*B29C 44/20* (2006.01)
(52) U.S. Cl. ............... 264/413; 264/48; 264/51; 264/293; 264/321; 264/492
(58) Field of Classification Search ............ 264/413, 264/492, 48, 51, 293, 321
See application file for complete search history.

(56) References Cited

U.S. PATENT DOCUMENTS

| | | | |
|---|---|---|---|
| 4,105,738 A | * | 8/1978 | Rohn .................. 264/163 |
| 4,201,818 A | * | 5/1980 | Rohn .................. 428/159 |
| 5,456,777 A | * | 10/1995 | Park et al. ............. 156/78 |
| 6,527,992 B1 | * | 3/2003 | Campbell et al. ........ 264/46.4 |

* cited by examiner

*Primary Examiner*—Allan R. Kuhns
(74) *Attorney, Agent, or Firm*—Bacon & Thomas

(57) ABSTRACT

The present invention discloses a method for manufacturing slippery-proof foam materials having protruded threads, which comprises the steps of foaming Thermoplastic Elastomer (TPE) or EVA pellets into a foam material plate, attaching a high heat resisting mesh cloth onto the surface of the plate, heating the plate by a heating device to soften the material to an extent of being suitable for a plastic formation, rolling and pressing the plate by a rolling mold or a piece of mold having an even surface and a plurality of tiny grooves thereon, so that the section of the plate receiving a larger rolling and pressing force moves towards the section receiving a smaller rolling and pressing force, and then passes through the meshes of the high heat resisting mesh cloth under the condition of being held up by the high heat resisting mesh cloth to form evenly protruded threads on the surface thereof after being cooled immediately.

11 Claims, 6 Drawing Sheets

METHOD FOR MANUFACTURING SLIPPERY-PROOF FOAM MATERIALS HAVING PROTRUDED THREADS

BACKGROUND OF THE INVENTION

1. Field of the Invention

The present invention relates to a method for manufacturing foam materials, more particular to a method for manufacturing a whole roll of continuous slippery-proof foam material plate or a sheet of foam having a strong structure and a plurality of protruded threads by using a foam material plates 2. Description of the Related Art In general, rubber foam materials have good elasticity and damping property, therefore they are usually used for manufacturing floors, cushions, or bushings and commonly used in our daily life for absorbing vibrations, insulating sounds, and resisting slippery, etc. However, the strength of foam material plates manufactured by rubber foam materials is weak and unable to stand a large shear stress. Therefore, the foam material plates are generally made in a square shape or a rectangular shape to prevent the rolled foam material plates from breaking caused by the pulling during the rolling and transportation processes.

Further, since the surface of the foam material plates are made flat and unable to have a significant slippery-proof effect, therefore some manufacturers use special molds and thermal formation method to manufacture square or rectangular foam material plates to solve the foregoing problem. A plurality of protruded threads is formed on the surface of these foam material plates to improve the friction on the surface of these foam material plates. However, such arrangement complicates the manufacturing procedure greatly and also increases the labor hours and related costs, but it still cannot overcome the shortcomings of the foam material plates being not able to be produced with sufficient strength in a mass production. Therefore, the scope of application of these foam materials is restricted.

Some foam material plate manufacturing procedures and manufacturers specially attach a fixed layer of mesh cloth onto the foam material plates to effectively improve the strength of the foam material plates and overcome the shortcomings of the foam material plates being not able to be produced with sufficient strength in a mass production. However, such arrangement greatly reduces the damping property and slippery-proof effect provided by the foam material plates and loses their features since the mesh cloth isolates other objects from the direct contact with the foam material plate.

SUMMARY OF THE INVENTION

In view of the conventional foam material plates being unable to be produced in a mass quantity and having the shortcomings of having insufficient strength and slippery-proof effect, the inventor of the present invention based on years of experience on the related industry to conduct extensive researches and experiments, and finally invented the method for manufacturing slippery-proof foam materials having protruded threads, and using such method to manufacture a strong slippery-proof foam material having protruded threads.

The primary objective of the present invention is to produce a foam material by foaming Thermoplastic Elastomer (TPE) pellets, and cutting the foam material into plates according to the required thickness, and then connecting the foam plates one by one to form a whole roll of continuous foam material plate. A high heat resisting mesh cloth is attached and fixed onto the surface of the foam material plate, and a heating device is used to heat and attach the high heat resisting mesh cloth onto the foam material plate. After the foam material plate is softened to the extent of being suitable for a plastic formation, a rolling mold having an even surface and a plurality of tiny grooves is used to roll and press the foam material plate, so that the section of the plastic formed foam material plate receiving a larger rolling and pressing force moves towards the section receiving a smaller rolling and pressing force, and passes through the meshes of the high heat resisting mesh cloth under the condition of being held up by the high heat resisting mesh cloth. Even and protruded threads are formed on the surface of the foam material plates, and these foam material plates are cooled immediately to form a whole roll of continuous slippery-proof foam material plate having a strong structure and a plurality of protruded threads.

The other objective of the present invention is to produce a foam material by foaming Thermoplastic Elastomer (TPE) pellets and cutting the foam material into plates according to the required thickness. A heating device is used to heat the foam material plate to the extent of being suitable for a plastic formation, and then a rolling mold or a piece of mold having an even surface and a plurality of tiny grooves is used to roll and press the softened foam material plate, so that the section of the plastic formed foam material plate receiving a larger rolling and pressing force moves towards the section receiving a smaller rolling and pressing force (or the section without being rolled or pressed at all), and passes through the meshes of the high heat resisting mesh cloth under the condition of being held up by the high heat resisting mesh cloth. Even and protruded threads are formed on the surface of the foam material plates, and these foam material plates are cooled immediately to form a whole roll of continuous slippery-proof foam material plate or a piece of foam having a strong structure and a plurality of protruded threads.

A further objective of the present invention is to introduce circular cooling water inside the rolling or pressing molds, such that the temperature at the surface of the rolling or pressing molds is kept low, and the foam material plate can be cooled immediately after the protruded threads are formed by rolling and pressing the foam material plates, and the protruded threads can be fixed in their shape quickly for a fast production of the slippery-proof foam material having protruded threads.

BRIEF DESCRIPTION OF THE DRAWINGS

To make it easier for our examiner to understand the objective of the invention, its structure, innovative features, and performance, we use a preferred embodiment together with the attached drawings for the detailed description of the invention.

DETAILED DESCRIPTION OF THE PREFERRED EMBODIMENTS

Figure 1:
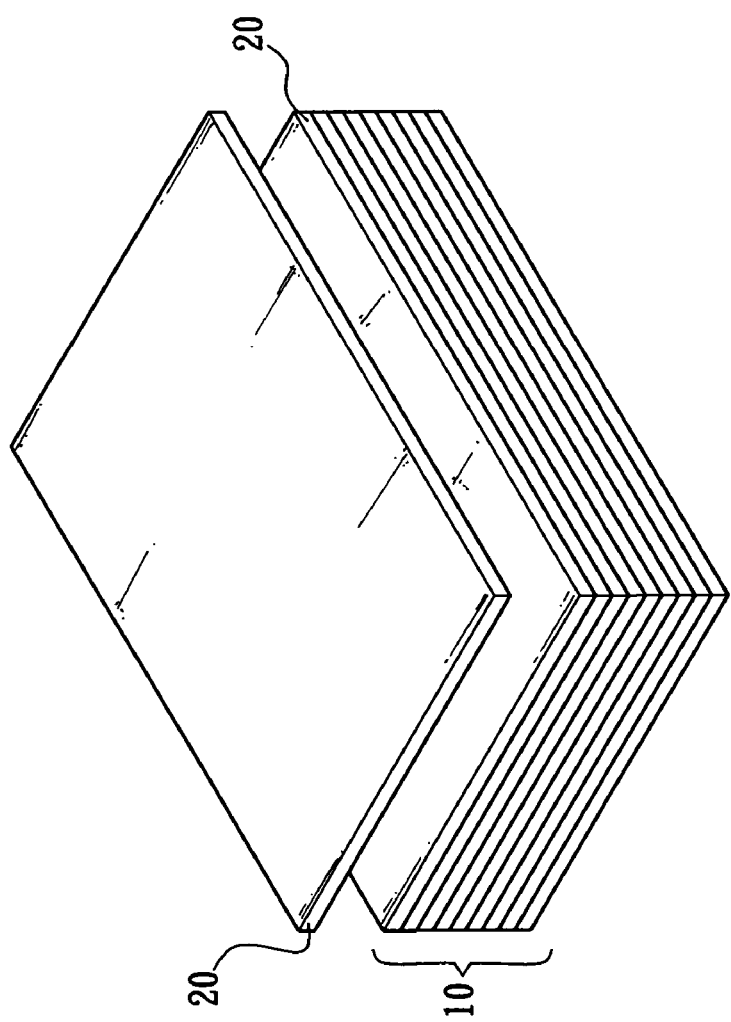
FIG. 1 is a perspective view of the foam material being cut into a plurality of plates according to the present invention.

The present invention uses Thermoplastic Elastomer (TPE) or EVA (Ethylene Vinyl Acetate) pellets to substitute the traditional raw rubber material, and also makes use of the special property of the elastomer pellets that can be formed easily by heating in the foaming manufacturing process to produce a slippery-proof foam material according to the present invention. In the manufacturing process of the invention, the Thermoplastic Elastomer (TPE) or EVA pellets are put into a mold for the foaming operation first, and after the foaming operation is completed, the foam material 10 is removed from the mold, and then the rough edges are trimmed to produce a cubic foam material 10 as shown in FIG. 1. The foam material 10 is cut into a plurality of plates 20 according to the actual required thickness.

Figure 2:
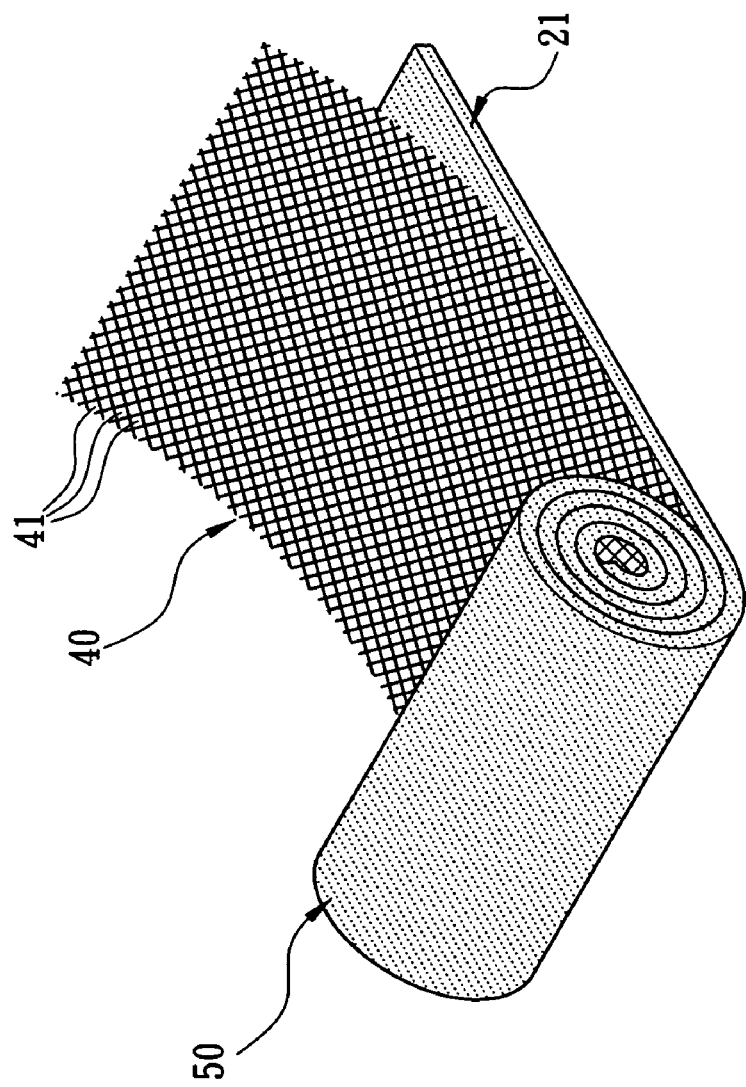
FIG. 2 is a perspective view of a whole roll of the foam material being attached with a high heat resisting mesh cloth on one side according to a preferred embodiment of the present invention.
Figure 3:
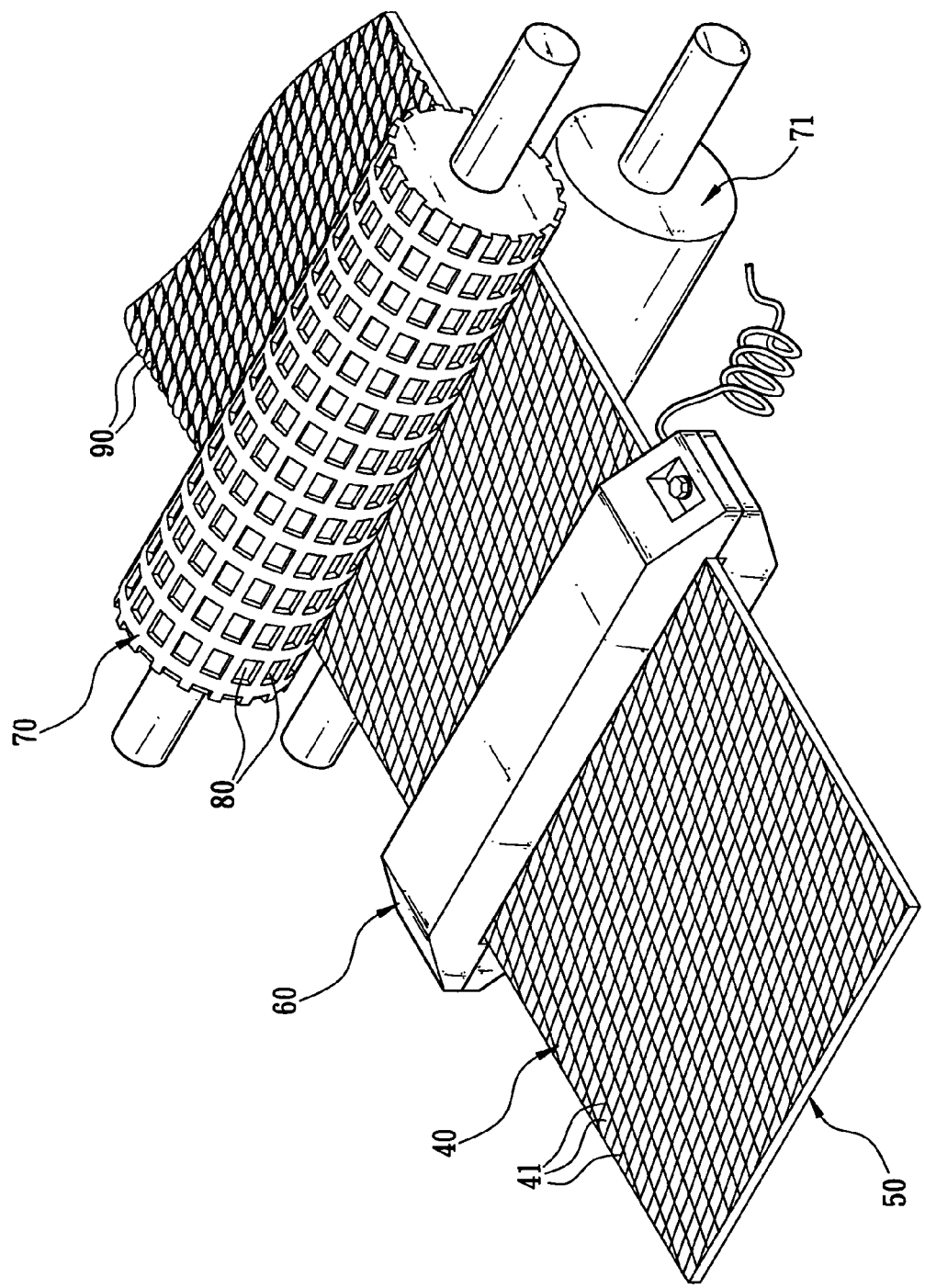
FIG. 3 is a view of the operation of the foam material plate being heated for its plastic formation and rolled and pressed for its formation according to a preferred embodiment of the present invention.

In a preferred embodiment of the present invention as shown in FIG. 2, the corresponding sides of the plates 21 are connected one by one to form a whole roll of continuous foam material plate 21, and then a high heat resisting mesh cloth 40 having meshes 41 with a predetermined size is attached onto one side of the whole roll of continuous foam material plate 21 (or both sides of the foam material plate 21 as needed) to produce a semi-finished goods 50 of the slippery-proof foam material in accordance with the present invention. The whole roll of continuous foam material plate 21 attached with the high heat resisting mesh cloth 40 is sent to a heating device 60 as shown in FIG. 3. The high temperature produced by the heating device 60 heats up the foam material plate 21 so that the foam material 10 is softened to the extent of being suitable for the plastic formation and then at least one set of rolling and pressing molds 70, 71 is used for rolling and pressing the foam material 10.

Figure 6:
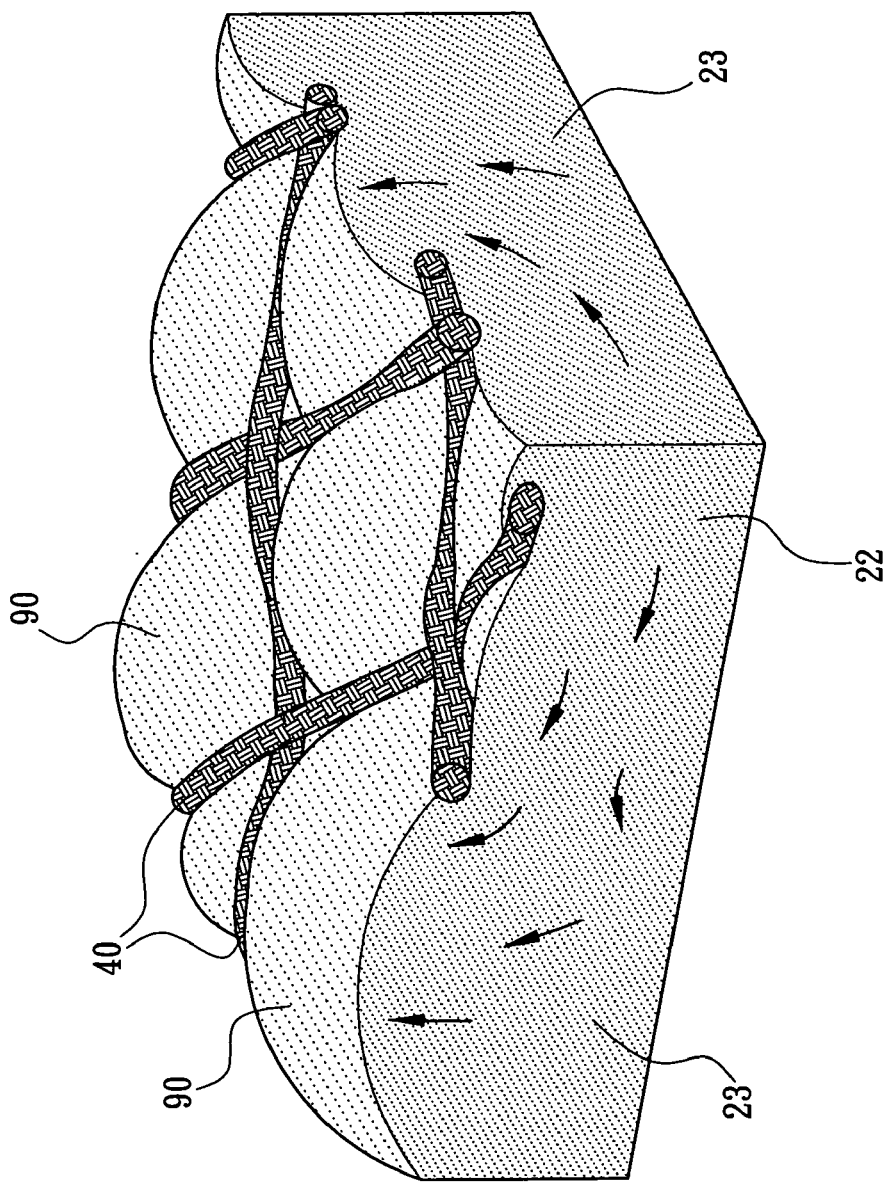
FIG. 6 is a cross-sectional view of part of the foam material plate processed in the rolling and pressing processes for its formation according to the present invention.

It is noteworthy that in the rolling and pressing molds 70, 71, the high heat resisting mesh cloth attached on one side of the rolling and pressing molds 70, 71 for rolling and pressing the foam material plate 21 has an even surface and a plurality of tiny grooves 80, such that a section 22 of the plastic foam material 10 as shown in FIG. 6 receiving a larger rolling and pressing force moves towards a section 23 of the plastic foam material 10 receiving a smaller rolling and pressing force (or the section which is not rolled or pressed at all) with respect to the section having the grooves 80 (as indicated by the arrow direction of the figure). The foam material 10 which is not held up by the high heat resisting mesh cloth 40 will pass through the meshes 41 of the high heat resisting mesh cloth 40 to form an even and protruded thread 90 at the corresponding position of each mesh 41. The foam material plate 21 is cooled immediately to produce a slippery-proof foam material having a strong structure and protruded threads 90 from the semi-finished goods 50 of the foam material.

Since the present invention goes through the procedures including the following two methods:

1. Continuous Foaming material: The roll of the foam is produced by the continuous foaming facility.
2. Piece Forming material: The stock of foam is produced by the piece foaming facility.

Either foam material can be applied the pattern embossing with the metal mold and high-heat resistant mesh, the formation procedures has included heating, plastic formation, rolling and pressing formation, and cooling for shaping to produce a whole roll of foam material plate 21 covered by a high heat resisting mesh cloth, therefore the manufacture is done by a systematic continuous way or a piece foam embossing to produce a slippery-proof foam material having a strong structure and protruded threads 90. The invention not only simplifies the production procedure, but also effectively reduces labor hours and cost as well as successfully achieves the mass production purpose.

Figure 4:
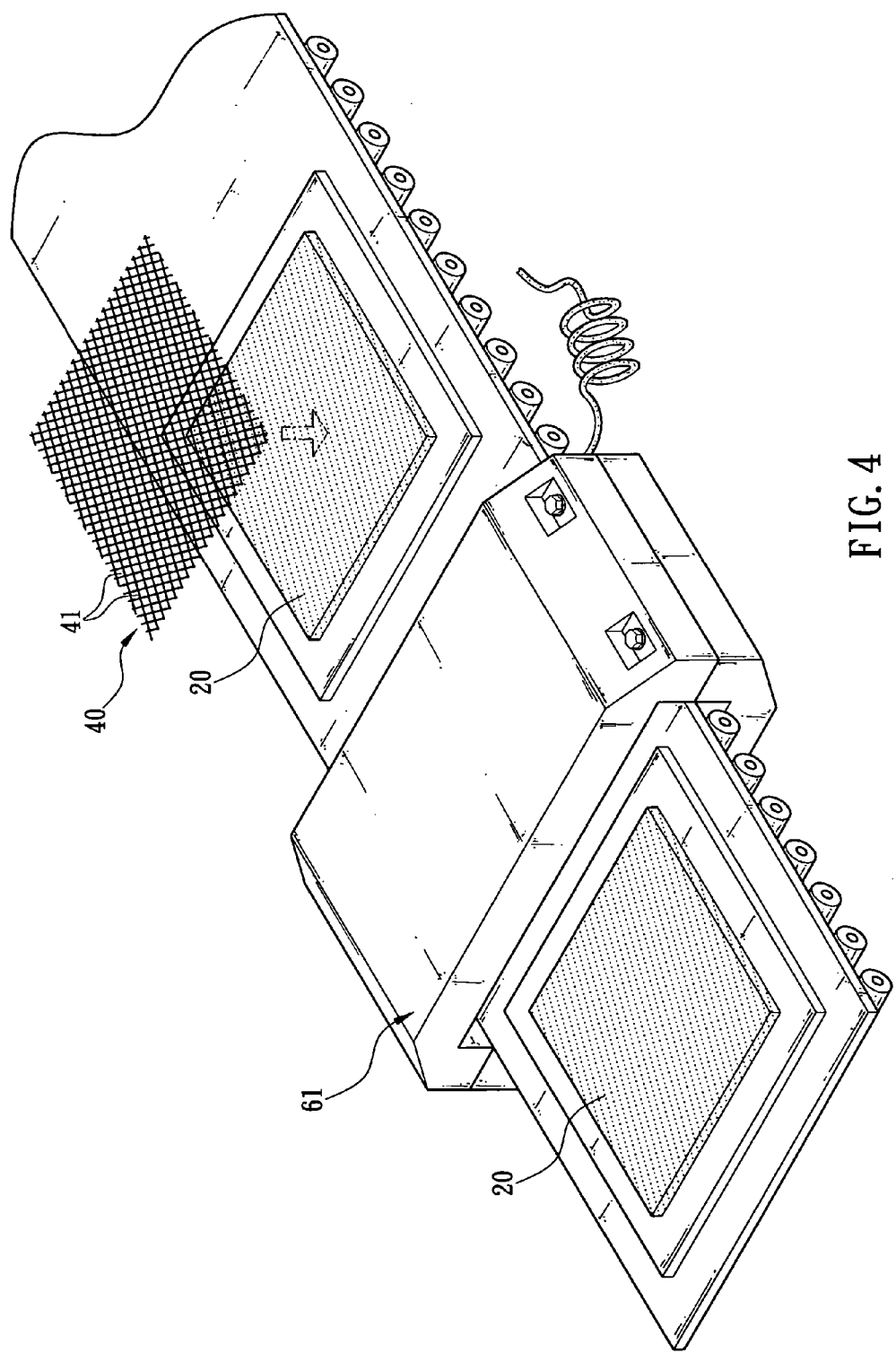
FIG. 4 is a view of the operation of the foam material plate being heated for plastic formation and attaching the mesh cloth according to a preferred embodiment of the present invention.

In another preferred embodiment of the present invention as shown in FIG. 4, each foam material plate 20 is sent one by one to a heating device 61, and the foam material plate 20 is heated by the high heat produced by the heating device 61 to soften the foam material 10 to an extent of being suitable for a plastic formation. Then, a high heat resisting mesh cloth 40 having meshes with a predetermined size is attached and fixed onto one side (or both sides) of the foam material plate 21, and the foam material plate 21 covered with the high heat resisting mesh cloth 40 is sent to the heating device 61 for heating the foam material plate 21 to an extent suitable for a plastic formation.

Figure 5:
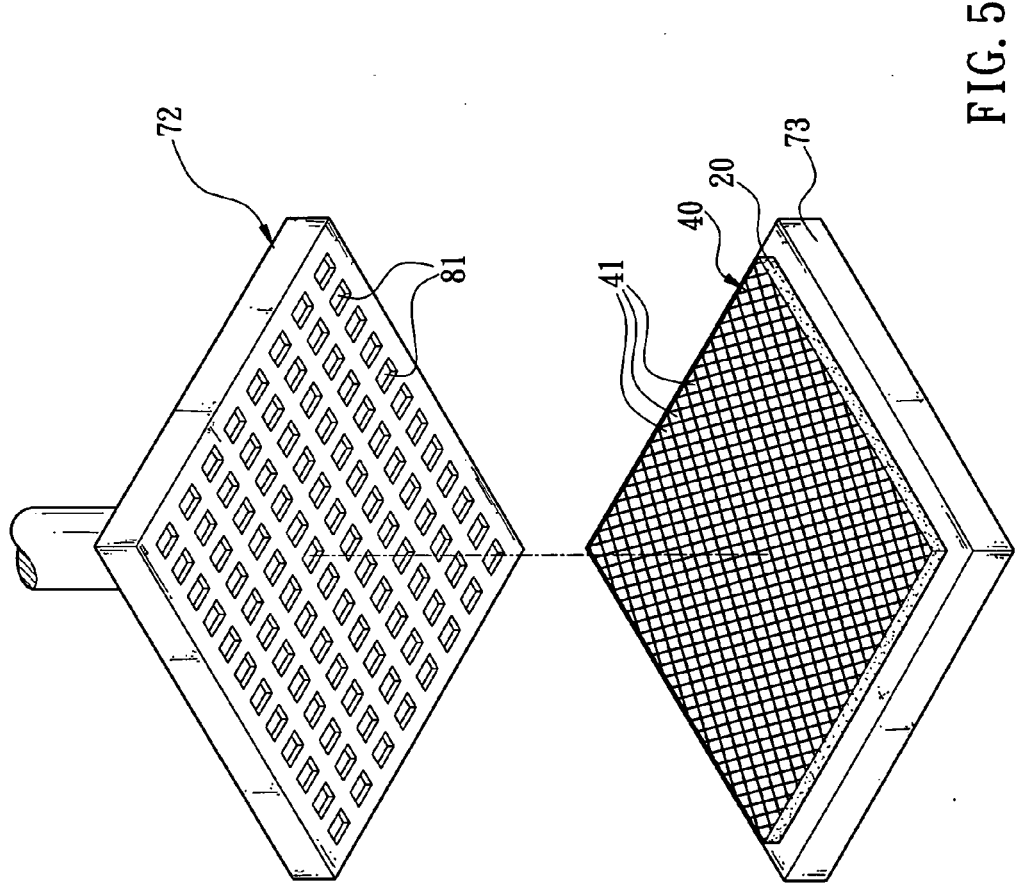
FIG. 5 is a view of the foam material plate being pressed into its formation according to a preferred embodiment of the present invention as depicted in FIG. 4.

Please refer to FIG. 5. An upper pressing mold 72 and a lower pressing mold 73 are used for the pressing. It is noteworthy that in the pressing molds 72, 73, the surface of the upper pressing mold 72 used for pressing one side of the foam material plate 20 covered by the high heat resisting mesh cloth 40 is even and has a plurality of tiny grooves 81. In the pressing process as shown in FIG. 6, a section 22 of the foam material after the plastic formation receiving a larger pressure moves towards a section receiving a smaller pressure (or a section receiving no pressure at all) in the direction as indicated by the arrows in the figure. At that time, the foam material 10 which is not held up by the high heat resisting mesh cloth 40 will pass through the meshes 41 of the high heat resisting mesh cloth 40 to form a protruded thread 90 at the corresponding position of each mesh 41 on the surface of the foam material plate according to the pattern of the meshes 41 on the mesh cloth 40. The foam material plate 21 is cooled immediately to produce a slippery-proof foam material having a strong structure and protruded thread pattern as the heat-resistant mesh from the semi-finished goods 50 of the foam material.

After the slippery-proof foam material is produced according to the embodiment of the invention, the mesh cloth 40 is removed, and a protruded pattern similar to that of the pattern of the mesh cloth 40 is formed on the surface of the foam material plate 20, 21.

The composition of the foam material 10 according to the foregoing embodiment of the invention includes 100 parts of Thermoplastic Elastomer (TPE) or EVA (ethylene vinyl acetate) pellets such as Styrene-Butadiene-Styrene (SBS) block copolymer, Styrene-Ethylene-Butylene-Styrene (SEBS) block copolymer, Styrene-Isoprene-Styrene (SIS) block copolymer and Ethylene Vinyl Acetate (EVA) by weight, 2~6 parts of foaming agent by weight, 0.1~1.0 part of cross-linking agent by weight, 5~60 parts of filler by weight, and 1~10 parts of aging resistant by weight. The size of the mesh 41 of the high heat resisting mesh cloth 40, such as polyester textile, should be at least 0.5 mm, and the high heat resisting temperature should be at least 140° C. The heating device 60, 61 could be an infrared furnace or a heating oven for heating the foam material plate 20, 21 when the foam material plate 20, 21 passes through the infrared furnace or the heating oven, so that the foam material can be softened quickly to the extent suitable for a plastic formation. A plurality of tiny grooves 80, 81 is disposed on the surface of the rolling mold 70 or the pressing mold 72, each having a depth of at least 1 mm and a width of at least 2 mm, and thus the section of the foam material corresponding to the grooves 80, 81 can have sufficient space during the rolling and pressing processes as shown in FIG. 6 for the section 22 receiving a larger pressure moves towards the section not receiving any pressure and passing through the meshes 41 of the high heat resisting mesh cloth 40 and forming an even and protruded thread 90 on the foam material at the position corresponding to each mesh 41.

Further, the rolling mold 70, 71 or the pressing mold 72, 73 according to the foregoing embodiment comprises even circular pipeline, so that cooling water is introduced in a circulation for cooling the foam material plates 21 to form protruded threads 90 during the process of pressing the foam material plates 21 in order to quickly manufacture a slippery-proof foam material having a strong structure and protruded threads 90. However, the invention is not limited to this embodiment, other independent cooling device can be substituted for cooling the foam material plate 21 after the foam material plate 21 is pressed by the rolling mold 70, 71 or the pressing mold 72, 73 in order to produce the foam material plate having a very good damping property and slippery-proof effect, and thus effectively improve the area of applications and the scope of usage of the foam material plate.

While the invention has been described by way of examples and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for manufacturing slippery-proof foam material having protruded threads, comprising the steps of:
   using Thermoplastic Elastomer (TPE) or EVA (Ethylene Vinyl Acetate) pellets to produce a foam material plate;
   attaching a high heat resisting mesh cloth having a plurality of meshes with a predetermined size onto at least one side of said foam material plate, and then using a heating device to heat said foam material plate until said foam material plate is softened to the extent of being suitable for a plastic formation; and
   using at least one mold to press said foam material plate, wherein said mold for covering said foam material plate and having one of its sides being pressed by said high heat resisting mesh cloth comprises a plurality of tiny grooves evenly disposed on at its surface, such that a section receiving a larger pressing force of said foam material moves towards a section receiving a smaller pressing force of said foam material when said foam material is pressed for plastic formation, and said foam material passes through said meshes to form an even protruded thread at the position corresponding to said each mesh on the surface of said foam material plate.

2. The method of claim 1, wherein said foam material plate is composed of 100 parts of Thermoplastic Elastomer (TPE) pellets by weight, 2~6 parts of foaming agent by weight, 0.1~1.0 part of cross-linking agent by weight, 5~60 parts of filler by weight, and 1~10 parts of aging resistant by weight.

3. The method of claim 2, wherein said Thermoplastic Elastomer (TPE) pellets are Styrene-Butadiene-Styrene (SBS) block copolymer.

4. The method of claim 2, wherein said Thermoplastic Elastomer (TPE) pellets are Styrene-Ethylene-Butylene-Styrene (SEBS) block copolymer.

5. The method of claim 2, wherein said Thermoplastic Elastomer (TPE) pellets are Styrene-Isoprene-Styrene (SIS) block copolymer.

6. The method of claim 2, wherein said Thermoplastic Elastomer (TPE) pellet is Ethylene Vinyl Acetate (EVA).

7. The method of claim 1, wherein said mesh of said high heat resisting mesh cloth has a size of at least 0.5 mm.

8. The method of claim 1, wherein said mesh of said high heat resisting mesh cloth has a heat resisting temperature of at least 140 degrees Centigrade.

9. The method of claim 1, wherein said mesh of said heating device is an infrared furnace for heating up said foam material plate to expedite softening said foam material to the extent of being suitable for a plastic formation when said foam material plate passes through said infrared furnace.

10. The method of claim 1, wherein said groove have a depth of at least 1 mm.

11. The method of claim 10, wherein said groove have a width of at least 2 mm.

* * * * *